United States Patent [19]

Girguis

[11] Patent Number: 4,932,922

[45] Date of Patent: Jun. 12, 1990

[54] TRIPOD PLUNGING CONSTANT VELOCITY JOINT

[76] Inventor: Sobhy L. Girguis, Magdalenenstrasse 19, D-5210 Troisdorf-Oberlar, Fed. Rep. of Germany

[21] Appl. No.: 253,369

[22] Filed: Sep. 30, 1988

Related U.S. Application Data

[63] Continuation of Ser. No. 47,530, May 4, 1987, abandoned, which is a continuation of Ser. No. 779,238, Sep. 23, 1985.

[30] Foreign Application Priority Data

Oct. 16, 1984 [DE] Fed. Rep. of Germany ....... 3437782

[51] Int. Cl.[5] .................................................. F16D 3/20
[52] U.S. Cl. ..................................... 464/111; 464/905
[58] Field of Search ............... 464/111, 122, 123, 124, 464/146, 905, 906

[56] References Cited

U.S. PATENT DOCUMENTS

| | | | |
|---|---|---|---|
| 2,722,115 | 11/1955 | Dunn | 464/124 |
| 2,752,766 | 7/1956 | Wildhaber | 464/123 X |
| 3,490,251 | 1/1970 | Roethlisberger | 464/124 |
| 4,379,706 | 4/1983 | Otsuka et al. | 464/111 |
| 4,385,899 | 5/1983 | Franklin, Jr. | 464/146 |
| 4,511,346 | 4/1985 | Hazebrook et al. | 464/146 |

FOREIGN PATENT DOCUMENTS

| | | |
|---|---|---|
| 0034073 | 8/1981 | European Pat. Off. . |
| 2748044 | 5/1978 | Fed. Rep. of Germany . |
| 1268917 | 6/1961 | France . |
| 18938 | 2/1914 | United Kingdom ............... 464/124 |
| 1108816 | 4/1938 | United Kingdom . |
| 1098597 | 1/1968 | United Kingdom ............... 464/123 |
| 2106219 | 4/1983 | United Kingdom ............... 464/111 |

Primary Examiner—Daniel P. Stodola
Attorney, Agent, or Firm—Davis, Bujold & Streck

[57] ABSTRACT

A constant velocity joint is provided with a hollow outer part with three axially extending grooves distributed on the periphery thereof, an inner part having three outwardly extending trunnions rotatably carrying three rollers, the trunnions being situated in the grooves of the outer part. Between the rollers and the groove walls, guides for the transmission of the tangential forces at least for one torque direction are provided; the guides being movable relative to the outer part. The relative axial motion of the inner to the outer parts, being the plunge of the joint, is divided into a primary plunge between the inner part and the guides and a secondary or residual plunge between the guides and the outer part.

16 Claims, 7 Drawing Sheets

TRIPOD PLUNGING CONSTANT VELOCITY JOINT

This is a continuation of co-pending application Ser. No. 047,530 filed on May 4, 1987, now abandoned which is a continuation of U.S. Ser. No. 779,238 filed on Sept. 23, 1985, now abandoned.

The invention relates to a constant velocity joint.

DE-OS 31 34 270 shows a prior art wherein at least for one direction of torque transmission, guides are axially fixed to the inner part by means of a fixing device, but are axially movable to the outer part by an amount equivalent to the plunge of the joint.

The result of this measure is that the periodical axial forces, which otherwise appear as alternating forces between the inner and outer parts, can be short-circuited within the joint through the fixing device. The fixing device transmits the axial plunging resistance in addition, and is thus constantly loaded with the sum of the axial forces, namely, the periodical axial forces and the plunging resistance.

The plunging resistance directly depends on the friction coefficient between the guides and the groove walls. In a simpler embodiment of the joint, for instance, according to FIG. 4c of DE-OS 31 34 270, sliding surfaces are provided so that the plunging resistance is relatively high. A higher plunging resistance is a disadvantage, for instance in motor vehicle use at the high-frequency range of the wheel oscillations, whereby the vibrations would be transmitted to a great extent through the plunging joint to the passenger compartment. Moreover, the fixing device will thereby be more severely loaded and must be dimensioned accordingly at a correspondingly greater expense. If rolling elements are inserted between the guides and the groove walls, in order to reduce the plunging resistance, then the construction will get to be larger and more complicated.

The object of the present invention is therefore to provide a constant velocity joint of the type described above having a compact design, at a relatively low cost, wherein the sum of the axial forces is reduced, at least over a portion of the plunge.

This problem is solved by dividing the total plunge of the joint prevailing between inner and outer parts into a primary plunge between the inner part and the guides and a secondary or residual plunge between the guides and the outer part by means of friction, force or form-locking elements. The plunging force in the field of the primary plunge is thereby decidedly reduced, since it is now mainly dependent on the friction coefficient of the bearing of the rollers multiplied by the ratio of the inner to the outer diameter of the rollers. If the primary plunge is defined by a limiting device, then said device is not loaded by the axial force in this field.

For a distinct division of the plunge, in order that the guides floating between the outer part and the rollers would not be exposed to any uncontrollable movements or oscillations, the invention proposes that the plunging resistance between the guides and the outer part be higher tan between the guides and the inner part. This can be achieved, among other means, by having a simple construction of mating sliding surfaces (guides/-groove wall) even in combination with rollers mounted on plain bearings. Basically, a short circuiting of the periodical axial forces does not take place at least in the field of the primary plunge. Therefore, a reduction of the periodic axial forces to the minimum in favor of a vibration-free travel in this field, according to the case of the application and length of the primary plunge, can now play a major role. As is previously known, the periodical axial force depends mainly on the frictional conditions of the transmission rollers. Comparing constant velocity joints of the construction described above having cylindrical rollers with those having spherical rollers, it will be found, as known also, that a displacement of the cylindrical rollers along their respective trunnions is not necessary contrary to spherical rollers. The additional displacement of the spherical rollers even equipped with needle bearings, along the trunnions give rise to a considerable frictional force the axial component of which increases the periodical axial force.

Accordingly, the invention proposes in addition that the rollers are made with a cylindrical outer surface and that the sides of the guides facing the rollers being flat. The length of the flat surface corresponds then to the axial stroke of the rollers at the maximum angle of the joint, added to the primary plunge.

According to an embodiment of the invention, it is proposed that the primary plunge be limited in the range of tenths of a millimeter. The magnitude here is, for example, of about 0.5 mm for a joint of a medium passenger motor vehicle. This amount corresponds to the amplitude at the plunging joint, which occurs at the high frequency wheel oscillation at constant speed. In this often traveled range, the plunging resistance is accordingly low so that a high degree of comfort or freedom of vibrations is achieved. When the vehicle is accelerated, or in case of great movements of the wheels, or in critical fields of high resonance, the corresponding amplitude at the joint gets greater so that a part of the secondary plunge is involved. The limiting device is now engaged and loaded with the consequence that the periodical axial forces within the joint are at least extensively short-circuited. This embodiment is thus adequate for extreme angle requirements.

According to a continuation of the conception of the invention, it is proposed that the primary plunge be limited in the millimeter range. The magnitude here is of the order of 10 mm, being preferably 5 mm, likewise for use in a medium passenger motor vehicle. This covers the displacement on the joint that most often occurs The joint is thus mainly utilized in the field of the primary plunge independently of a change in the loading condition. The secondary plunge is involved in the case of a great bounce or rebound of the wheel, for example, on uneven roads or in quick curve driving, whereby the additional friction between guides and groove walls can result in a favorable shock absorption. The advantages of the chatter-free abutments of the secondary plunge can be fully utilized. This embodiment is adequate for high angle requirements and also for motor vehicles having a soft wheel or differential suspension.

A further continuation of the concept of the invention is that the primary plunge corresponds to the main portion of the total plunge of the joint. The secondary plunge is thus confined to a smaller portion of about 10 to 40% of the whole plunge and lies on one or both sides of the primary plunge, whereby the plunging resistance in this residual field acts in the sense of a torque-controlled damping device. The damping action can be increased at relatively small cost by force-locking elements.

If the primary plunge corresponds to the total plunge of the joint, then a limiting device confines itself to axial abutments between inner and outer parts, since the guides have to be quasi-axially fixed in the outer part.

When the joint rotates at angle, the cylindrical rollers move to and fro along their respective guides similar to a roller of a swinging axial roller bearing so that a friction couple, as a result of the width of the rollers will occur reducing the smooth running of the joint, specially in the case of large joint angles. Therefore, the invention further proposes that each roller be composed of a pluarlity of adjacent round discs. The discs roll on the respective paths at different speeds.

A particularly favorable construction of the rollers proposes that each roller be made of two crowned discs. Hereby it is possible to compensate eventual differences in the radial dimensions of the discs by a respective tilting of the guides. The tangential force is thus isostatically transmitted.

An advantageous embodiment of the constant velocity joint, specially for the transmission of alternating torques, consists of guides on both sides of the respective roller being interconnected and/or that the respective guide be preloaded on its respective groove wall in order to eliminate eventual negative effects of centrifugal force and development of noise. The preloading makes it further possible to increase the plunging resistance in the field of the secondary plunge to be predetermined according to the respective requirements.

In continuation of the conception of this invention and with special regard to the cost-utility relationship, the invention proposes that the guides on both sides of a roller be formed as a ring surrounding the roller, the groove wall having a circular cross section corresponding to the spherical outer surface of the ring. The primary plunge between inner part and guides depends on the straightness of the guides. In an encirclement having a clearance fit, this is almost zero. The path of the groove wall can be designed parallel to the main axis of the joint or outer part, or in arcuate form.

Special advantages of this embodiment are that no displacement of the rollers along their respective trunnions is required so that a turning bearing such as a needle bearing does not have to sustain any axial component, thus favorably effecting its design and capacity. A displacement parallel to the trunnion axis takes place between the ring and the roller, thereby improving the layout and the capacity, in comparison to joints where this displacement takes place on the small diameter of the trunnion. The mating surfaces roller/ring can be constructed with a round or a non-round cross section such as more-sided, splined, etc.

To reduce the periodical axial forces in this embodiment, the invention proposes that a low-friction linear bearing be provided between the rollers and the rings. Because of the relatively big surface of contact here, the use of a plastic coating, of a surface impregnation, of a low-friction lacquer, or the like represents a very significant achievement at reasonable cost, which at least, due to the relatively low sliding speeds, ensures a long endurance at a constant and low friction coefficient. Owing to the ample dimensioning, it is further possible to obtain a wedge-like, lubricant-effective construction in which one of the contours of these mating surfaces is crowned.

The multiple possibilities of construction of this invention are explained with reference to the diagrammatic drawing and descriptions of different embodiments from which additional features according to the invention will result.

The invention will now be described, by way of example, with reference to the accompanying drawings, in which.

Figure 1:
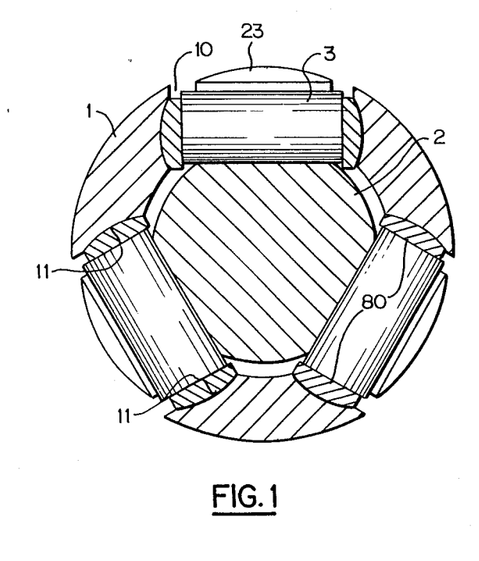
FIG. 1 is a fundamental partial cross section of the joint according to different embodiments, for instance, according to Section I—I of FIG. 7.

FIG. 1 shows a joint with the outer part 1 having three longitudinal grooves 10 distributed or its periphery. Groove walls 11 extend on both sides of the respective grooves 10, and are of circular cross section. Further shown is the inner part 2 on which three cylindrical rollers 3 are radially mounted and fixed by means of the retaining washer 23. Between the respective rollers 3 and the slotted walls 11 guides 80 are provided for direct transmission of the tangential forces for both torque directions. The plunge motions extend perpendicularly to the plane of the drawing; the primary plunge between the rollers 3 of the inner part 2 and the guides 80 and the secondary plunge between the guides 80 and the outer part 1. The rollers 3 additionally move substantially perpendicularly to the plane of the drawing as a product of a joint angle between the inner part 2 and the outer part 1, but without having to involve any plunge.

Figure 2:
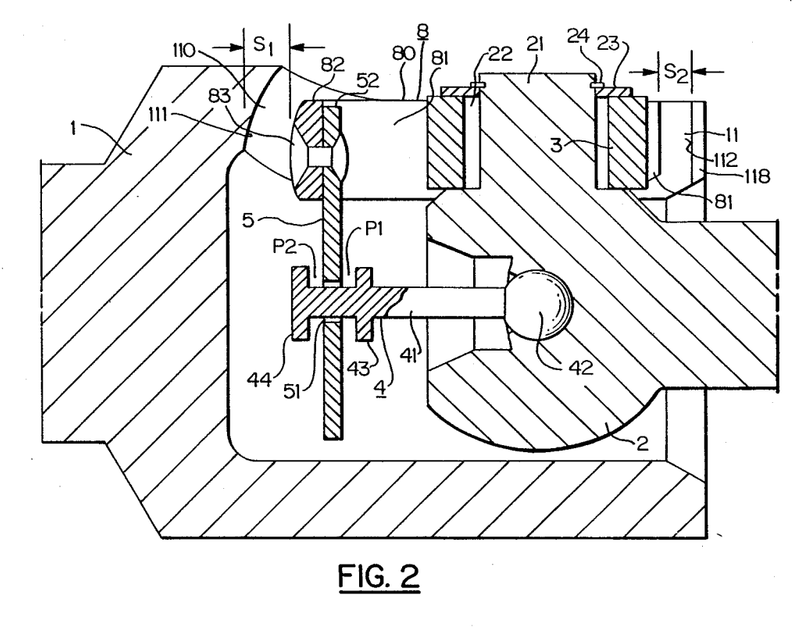
FIG. 2 is a longitudinal section of a joint having bilateral form-locking limitations of the primary and secondary plunges.

FIG. 2 shows the outer part 1 having a groove wall 11 and a groove end 110. A U-shaped double guide 8 is shown with one of the guides 80 and a connection portion 82. The surface 81 of the guide bar 80 is flat as is the opposite surface of the other guide (not shown in FIG. 2). The inner part 2 shows a radially extending trunnion 21, the roller 3 being pivotally mounted thereon via needle bearings 22. The retaining washer 23 and its circlip 24 serve to retain the roller 3 on its trunnion 21. Of course, FIG. 2 discloses only one of three such arrangements as shown in FIG. 1. A limiting device 4 is provided for the primary plunge and has the pinnion 41 with a ball end 42 and abutments 43 and 44. The ball end 42 is pivotally attached to a recess in the inner part (which is of spherical form) 2. The pressure and tension abutments 43 and 44 are located on each side of a base 5, the bore 51 of which centrally surrounds the pivot 41 between the abutments with clearance. The base 5 also has three outwardly radially extending attachments 52 (one only being shown in FIG. 2) each of which is fixed to a connecting member 82 by a rivet-like pivot shaft 83. The primary plunge corresponds in magnitude to the sum of the axial spacings P1 and P2, existing between the abutments 43, 44 and the base 5. The primary plunge accordingly can be designed for any desired length. In the spaces between the abutments 43, 44 and the base 5, resilient and/or damping elements (not shown) can also be provided, according to utilization and requirements. The groove wall 11 has an abutment 112 whereby surface 118 lies approximately at the same level as the face 81 of the guide 80. Thereby the secondary plunge of the guide 80 is limited to the sum of the spacings between the abutment 112 and the guide 80 and between the groove bottom 111 and connecting portion 82. Thus, the secondary plunge is the sum of spacing: S1 and S2. The length of the flat surface 81 corresponds to the axial stroke of the rollers resulting from the joint angle in addition to the primary plunge P = P1 and P2. The primary plunge can alternatively be provided as being an axial clearance in the area of the ball end 42 or in the area of pivot 83.

Figure 3:
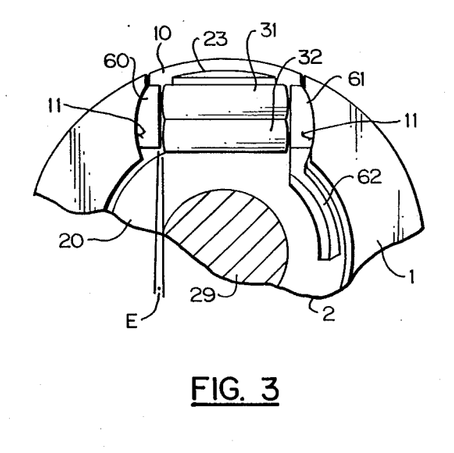
FIG. 3 is a partial section of a joint having crowned discs and two different guides.

FIG. 3 shows the outer part 1 with groove 10 and groove walls 11 and the inner part 2 with drive shaft 29. On the inner part two discs 31 and 32, together forming the roller 3, are mounted and outwardly fixed by the retaining ring 23. The inner part includes a spherical portion 20. The forked guide 61 is provided for the transmission of tangential force in one direction of rotation and has limiting legs 62 which allow a certain primary plunge up to the spheric member 20 perpendicular to the plane of the drawing. The plunge remains constant independently of the angle of the joint. This Figure shows the joint in a loaded state, the guide 60 being unloaded. This guide is constructed independently of the guide 61 and thus the centrifugal force results in a gap E, as shown. As soon as the guide 60 is loaded, it assumes the loaded position, both discs 31 and 32 transmitting the tangential force. By virtue of the possible tilting of the guide, eventual differences in the outer diameter of the discs 31 and 32 or differences of their bore diameters, etc., can be compensated. The load thus remains isostatic.

Figure 4:
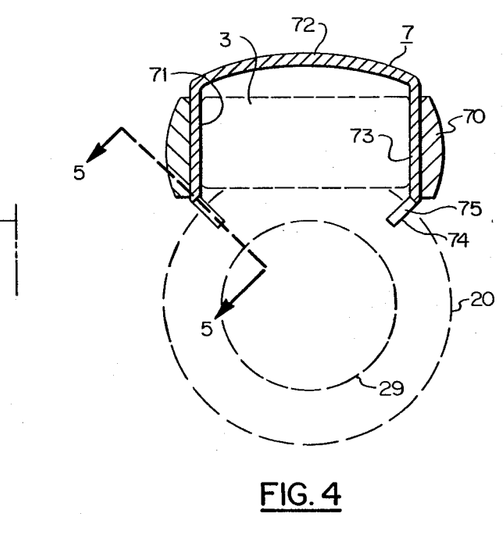
FIG. 4 is a double guide with bilateral limitation of the primary plunge.

FIG. 4 shows a double guide 7 comprising two walls 73, a connecting member 72 and four fins 74. The interior surfaces 71 of the walls 73 are flat. Two guides 70 are secured to the outer surfaces of the walls 73, for instance, by adhesion. The fins 74 with their abutment surfaces 75 serve for limiting the primary plunge in combination with a spheric member 20 shown in dotted lines. Likewise shown in dotted lines are the connecting shaft 29 and the roller 3. A particularity of this embodiment is that the U-profile (72 +73) can be made from thin-walled spring steel, for example, which can be produced with an adequate sufficient hardness without any heat treatment distortions worth mentioning. The guides 70 can by all means be left unhardened, since the contact pressure between these and the groove walls is very low. Another particularity is the fact that the primary axial displacement becomes smaller as the joint angle increases through the kinematic property of the weaving of this joint. This can be advantageous in the adjustment of a drive train. The connecting member 72 can be used to produce a loading between the guide 70 and the groove wall 11.

Figure 5:
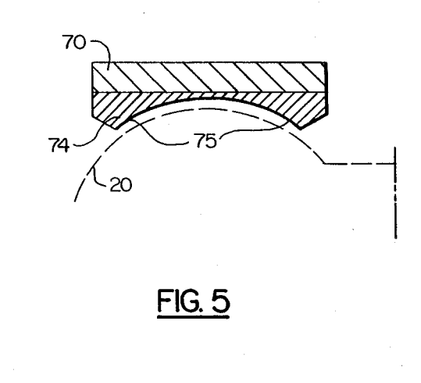
FIG. 5 is a diagonal section along the plane 5—5 of FIG. 4.

FIG. 5 shows an inclined section along the plane 5—5 of FIG. 4. The primary displacement is a product of the space between abutment surfaces 75 of the fins 74 and the spherical portion 20. When the joint is bent, said space is reduced due to the weaving.

Figure 6:
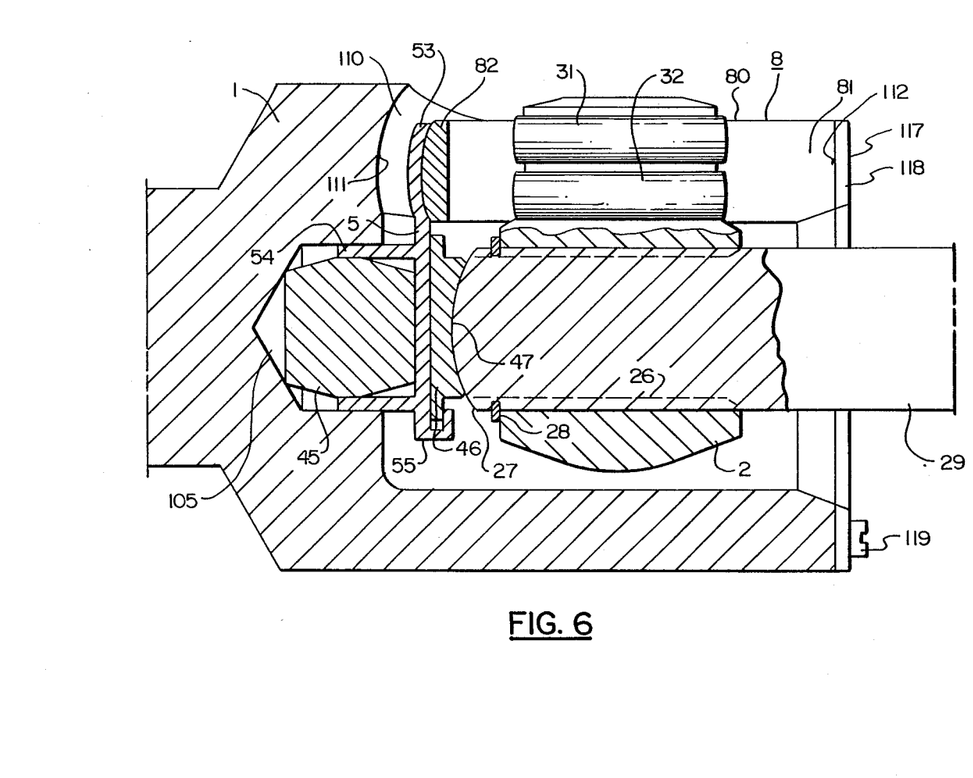
FIG. 6 is a longitudinal section of a joint having a one-sided force-locking limitation of the plunges.

In FIG. 6 the outer part 1 shows only one of three equi-spaced pressure abutments 111. The inner portion 2 is connected with the drive shaft 29 by means of the splines 26 and is axially secured thereto by a retaining ring 28. The base 5 of a limiting device has three socket-like radially extending attachments 53 which reach into the groove ends 110 of the outer part 1. In addition, the base 5 has a hollow cylindrical attachment 54 which extends into a bore 105 of the outer part 1 along the axis of the joint. In the space between the bore 105 and the base 5 a compression member 45 made of an elastic material is provided. The U-shaped double guide 8 is on one side limited in its movement in resilient manner by the compression element 45 via the socket-like attachment 53 and the base 5. On the other side of the U-shaped guide 8, three segments 117 are secured with screws 119 (one only being shown) on the plane surface of the outer part 1. Each segment has one flat surface 118 which is at approximately the same height as the plane 81 of the guide 80 so that the abutment surfaces 112 limit the displacement of the U-shaped guide 8 toward the segments 117. The U-shaped double guide 8 is thus biased into position in the outer part 1 by the compression member 45. Between the spheric surface 27 of the connecting shaft 29 and the base 5 a thrust washer 46 is situated having a hollow spherical surface 47. The thrust washer 46 can be radially displaced to the base 5 and is fixed to it by means of three holding hooks 55 (one only being shown) in order to compensate weaving between the inner to the outer parts. If the inner part 2 moves from the position shown in the drawing to the left, the compression element becomes loaded and the socket-like attachment 53 is lifted off the connecting portion 82. Thereby it is possible to achieve a torque-independent damping in this area of the joint; a property, which, among others, can be extremely important in motor vehicles drives. The U-shaped double guide 8 can remain displaced through friction contact, but should the roller 3 come into contact with the connecting portion 82, it can also yield to the left. If the connecting portion 82 is pivotally connected with the attachment 53, then the plunging resistance will be increased by the friction between the guides 80 and the corresponding groove walls. If the segments 117 are extended in a peripheral direction so that the surface 118 is higher than the plane 81 of the guide 80, thus covering at least a part of the cross section of the discs 31 and 32, then this extension will act as an abutment for the discs 31 and 32.

Figure 7:
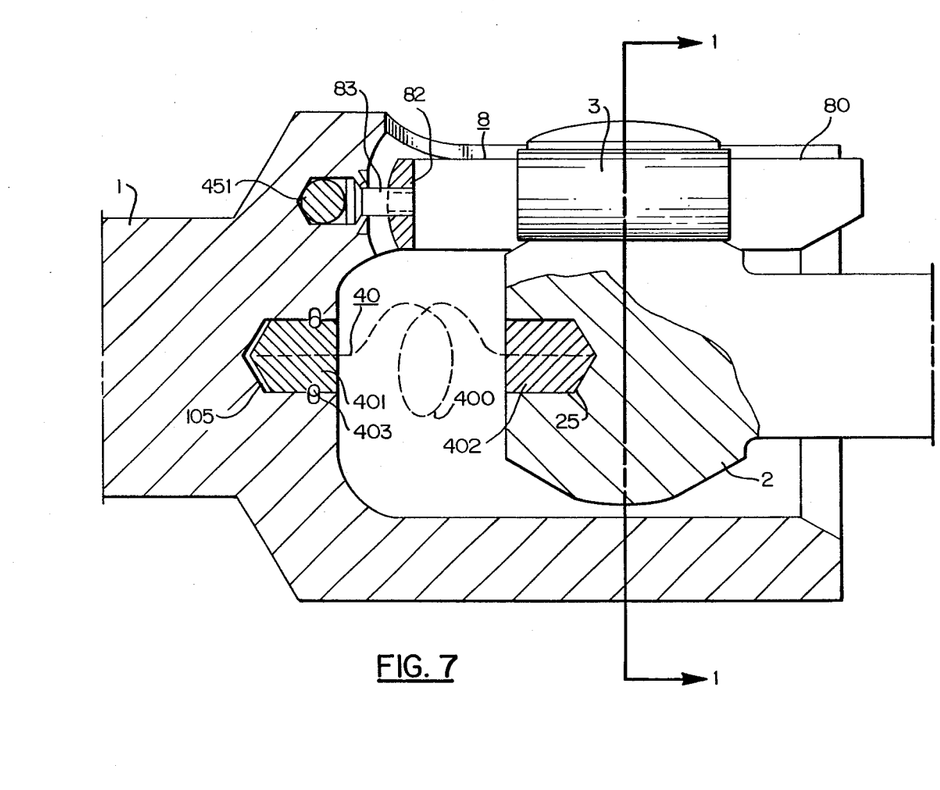
FIG. 7 is a longitudinal section cf a joint having a tension limitation of the primary plunge.

The embodiment in FIG. 7 has a U-shaped double guide which is positioned relative to the outer part 1 by means of swiveling screw 83 and pressure member 451. The three double guides 8 (one only being shown) perform their respective secondary plunge independently of each other as soon as the respective roller 3 comes into contact with the respective connection portion 82. This occurs simultaneously when the joint is straight. The extraction of the inner part 2 from the outer part 1 or the guides 80 is ensured by a tensile limitation device 40 which comprises two clamping inserts 401 and 402 and a tensile member 400, such as a string, wire, or the like, which is captively fixed in the clamping inserts. The clamping inserts 402 are in turn fixed by an interference fit in the bore 25 of the inner portion 2, the clamping pivot 401 is locked in the bore 105 of the outer part 1 by the snap ring 403. Due to the fact that tensile abutment is provided between the inner and outer parts, situated in the interior of the joint, the guide 80 can be constructed longer and, as shown here, even extending beyond the plane surface of the outer part 1. Weight and space are saved thereby.

Figure 8:
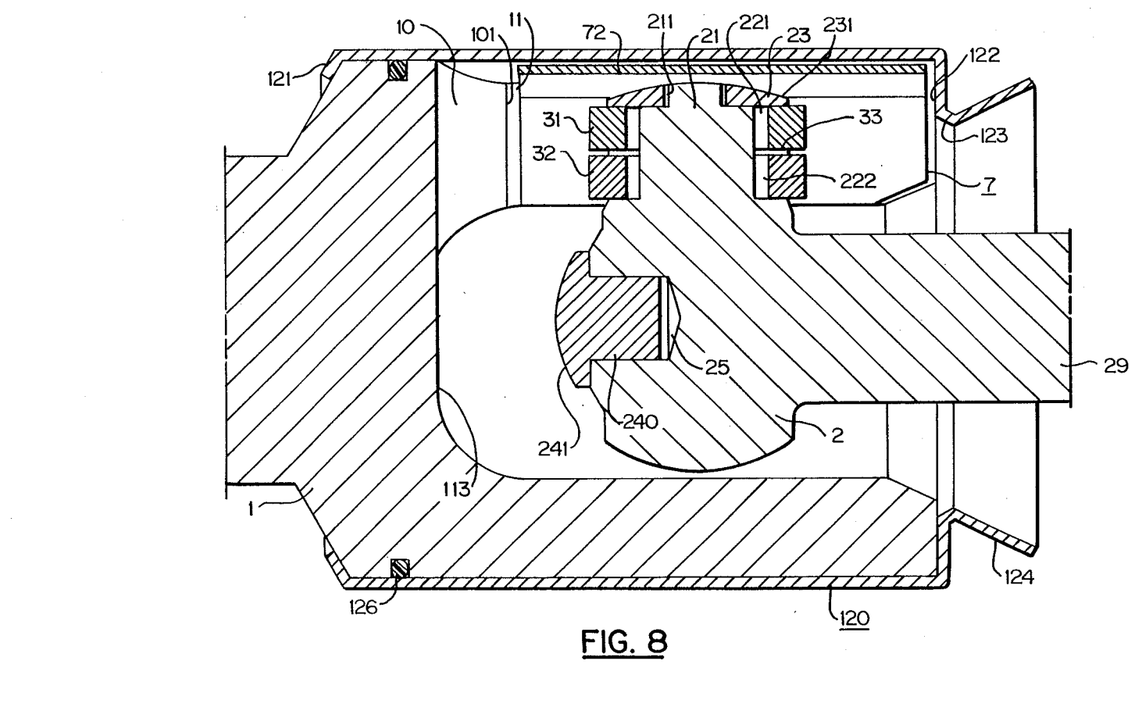
FIG. 8 is a longitudinal section cf a joint having a device for simultaneous limitation of the plunge between inner and outer part.

A sheet-metal casing 120 in FIG. 8 serves as a cover of the outer part 1. A rubber ring 126 is provided for hermetic sealing on one side. The extension 124 serves to fasten a rubber boot which surrounds the drive shaft 29 on the other side. To fasten the sheet-metal casing, a abutment surface 122 is compressed on the outer part 1, a flange 121 being rolled down. The groove walls 11 extend up to the abutment surface 101. A double guide 7 with the connecting member 72 is housed in the slot 10 similarly as in FIG. 4 and is axially positioned between the abutment surfaces 101 and 122. The abutment surfaces 101 and 122 remain substantially unloaded as long as the static or dynamic sliding friction between the guides and the groove walls 11 is effective so that said abutments 101 and 122 serve more for safety purposes, specially when the joint is not loaded. The trunnions 21 on the inner part 2 have a threaded extension 211 which serves for fastening the retaining washer 23. Two crowned discs 31 and 32 are respectively supported on needle bearings 221 and 222 between which the spacer 33 is inserted. The plane surface 122, which comes into contact with the disc 31, serves as a tensile abutment for the inner part at low joint angles. With a larger joint angle the spheric surface 231 of the retaining washer 23 abuts on the hollow spheric surface 123 of the sheet-metal jacket 120. The abutment piece 240, which is introduced in the bore 25, serves as a pressure abutment of the inner to the outer part. The spherical surface 241 of the abutment piece 240 then comes into contact with the bottom 113 of the cavity of the outer part. The abutment piece can be made of elastic material for damping.

Figure 9:
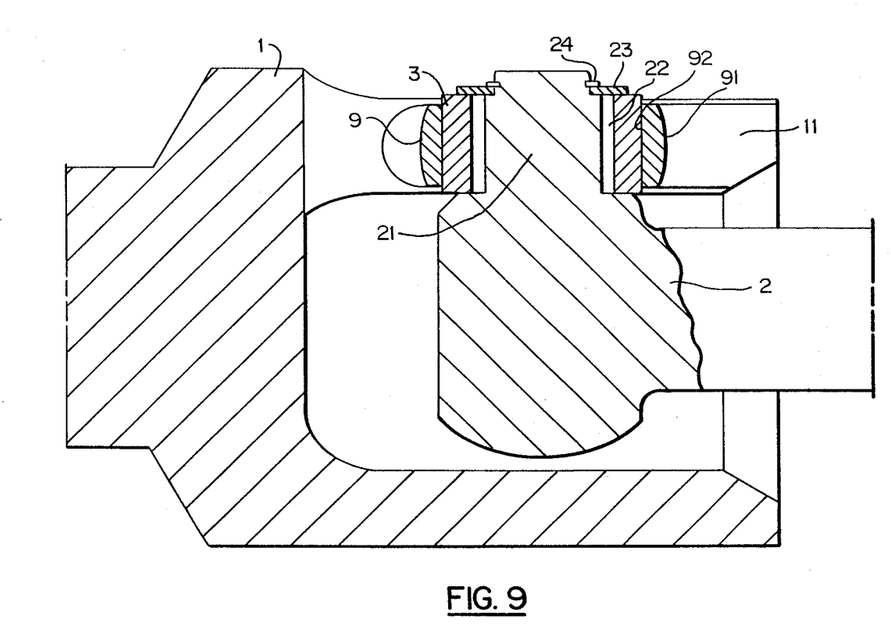
FIG. 9 is a longitudinal section cf a joint having a guide that is tightly wrapped around the roller in the form of a ring.

The guide wall 11 in the outer part 1 of FIG. 9 is likewise of a hollow cylindrical form. The inner part 2 has radial trunnions 21 (only one being shown) on which rollers 3 (only one being shown) are rotatably mounted over a needle bearing 22. The retaining washer 23 and the circlip 24 serve as means for holding the roller 3 and needle bearing 22 in position. The cylindrical roller 3 is in a ring 9 the outer surface 91 of which has a spherical shape. The inner surface 92 of the ring 9 is likewise cylindrical. The diametral clearance between the roller 3 and the ring 9 can be established as desired, but is set in this example as a normal clearance fit. Thereby the primary plunge is eliminated in favor of a large surface contact between the roller 3 and the ring 9. When the joint rotates at angle, the ring 9 reciprocates along the roller 3 in the direction of the axis of the trunnion. A rotation between the ring 9 and the roller 3 can only be considered in emergency cases, that is, when the roller 3 is prevented from rotating over the needles 22 due to damage thereof. The friction coefficient of the needle bearing is very low, as is known per se. In addition, the radius of the needle bearing is smaller than that of the mating surfaces of roller 3/ring 9, so that the relative movement between the ring 9 and the roller 3 occurs exclusively in the direction of the trunnion axis. The capacity for force transmission between the ring 9 and the roller 3 is certainly high by virtue of the generous contact surface. A plastic or similar coating on one of the interacting surfaces of this pair for reducing the friction forces is thereby recommended, specially since the average relative speed of the surfaces is relatively low. In a needle bearing of this kind the wall thickness of the outer race (here the roller 3) should not fall short of certain ratios. But through the enclosure of the ring 9, the wall thickness of the roller 3 can be kept relatively small so that the whole size—see the spheric diameter 91—can be kept small with the consequence that the joint as such requires a relatively small space. In order to reduce the frictional forces further, the path of the groove wall 11 can be made arcuate and not extending axially as shown. Thus, the displacement between the roller 3 and the ring 9 and in consequence the sliding friction vector between the spherical surface 91 and the groove wall are reduced. If the ring 9 is surface-coated by a dipping process, for instance, impregnated with synthetic material or treated with sliding lacquer, then a double effect is obtained, namely, the reduction of the linear friction between the ring 9 and the roller 3 and also the sliding friction between the ring 9 and the groove wall 11. Accordingly, the periodical axial force will be improved twofold. The axial fixing of the rollers 3 on their respective trunnions 21 can in addition be designed as a low-friction embodiment.

As explained, the joints having cylindrical rollers offer a series of advantages. But joints having spherical rollers can also be performed according to the same teachings, whereby the joint in FIG. 9 can be used in combination with the aforementioned teachings.

I claim:

1. A constant velocity joint of a compact design comprising a hollow outer part having three equally spaced longitudinal grooves, each providing two opposite groove walls of circular cross section, an inner part having three outwardly projecting trunnions placed within said grooves, the axes of said trunnions lying in one plane, at least one cylindrical roller non-pivotably rotating around each of said trunnions, guide means interposed between said rollers and said groove walls to accommodate direct transmission of tangential forces between said inner and said outer parts, allowance being made for said inner part to plunge axially within said outer part, wherein a primary plunge involves a rolling motion of said at least one roller on an inner juxtaposed surface of said interposed guide means and is confined by stop means between said inner part and said guide means and a secondary plunge involves a sliding motion between said guide means and said outer part, wherein said primary and said secondary plunges are each more than manufacturing tolerances.

2. A constant velocity joint according to claim 1, wherein said guide means are elongate guides, each having an essentially flat surface coacting with said roller and an essentially cylindrical surface coacting with said groove wall whereby said cylindrical rollers roll along said flat surface of said guides in the course of said primary plunge, and said guides slide along said groove walls in the course of said secondary plunge, the total plunge being equal to the sum of said primary and said secondary plunge.

3. A constant velocity joint according to claim 2, wherein said primary plunge (P1+P2) is limited by abutments (43, 44, 20) attached to said inner part (2) and axially opposed corresponding abutments (5, 62, 74, 82) attached to said guides (8, 61, 7).

4. A constant velocity joint according to claim 3, wherein said abutments (43, 44) are provided by a ball-end pinnion (41) centrally and pivotably attached to said inner part (2), and said corresponding abutments being provided by a base (15) attached to said guides (8), whereby resilient members can be placed between said abutments (43, 44) and said corresponding abutments (5).

5. A constant velocity joint according to claim 3, wherein said abutments are provided by a generally spherical central portion (20) of said inner part (2), and said corresponding abutments being provided by legs (62) or fins (74) attached to said guides (61, 7).

6. A constant velocity joint according to claim 2, wherein said secondary plunge (S1+S2) is limited by abutments (111, 112) attached to said outer part (1) and axially opposed corresponding abutments (81, 82) attached to said guides (8).

7. A constant velocity joint according to claim 2, wherein said secondary plunge is limited by resilient members (45, 451) placed axially between said outer part and said guides (8).

8. A constant velocity joint according to claim 2, wherein said primary plunge is limited by a resilient member (45) axially placed between said inner part and said outer part.

9. A constant velocity joint according to claim 2, wherein said primary plunge is limited by a tension element (400) having ends which are axially and oppositely attached to said outer part and said inner part.

10. A constant velocity joint according to claim 2, wherein said primary plunge (P1+P2) is less than one millimeter.

11. A constant velocity joint according to claim 2, wherein said primary plunge (P1+P2) lies between one and ten millimeters.

12. A constant velocity joint according to claim 2, wherein said primary plunge (P1+P2) represents a major part of said total plunge.

13. A constant velocity joint according to claim 2, wherein each said roller comprise a plurality of adjacent round discs (31, 32).

14. A constant velocity joint according to claim 13, wherein each said roller is composed of two crowned discs (31, 32).

15. A constant velocity joint according to claim , wherein said guides (70, 80) on the opposite side of said rollers (3) are interconnected by at least one element (72, 82) having an elasticity which provides a preload of said guides (70, 80) against said groove walls (11).

16. A constant velocity joint of a compact design comprising a hollow outer part having three equally spaced longitudinal grooves, each providing two opposite groove walls of circular cross section, an inner part having three outwardly projecting trunnions placed within said grooves, the axes of said trunnions lying in one plane, at least one cylindrical roller non-pivotably rotating around each of said trunnions, at least one pair of elongate guides joined to form at least one generally U-shaped guide means interposed between said rollers and said groove walls to accommodate direct transmission of tangential forces between said inner and said outer parts in both directions, each said elongate guides having an essentially flat inner surface coacting with said at least one cylindrical roller and an essentially cylindrical outer surface coacting with said groove wall, allowance being made for said inner part to plunge axially within said outer part, limiting device means being attached to said inner part and interacting with a base member attached to said guide means wherein said limiting device means and said base member define an axial spacing therebetween which corresponds to the magnitude of a primary plunge, said primary plunge involves a rolling motion of said at least one roller on the inner surface of said interposed U-shaped guide means whereby said at least one cylindrical roller rolls along said flat surface and is solely confined between said inner part and said guide means and a secondary plunge involves in sliding motion between said guide means and said outer part whereby the outer surfaces of said U-shaped guide means slide along said groove walls, said primary and said secondary plunges are each more than manufacturing tolerances and the total plunge being equal to the sum of the primary and the secondary plunges.

* * * * *

UNITED STATES PATENT AND TRADEMARK OFFICE
CERTIFICATE OF CORRECTION

PATENT NO. : 4,932,922

DATED : June 12, 1990

INVENTOR(S) : Sobhy Labib GIRGUIS

It is certified that error appears in the above-identified patent and that said Letters Patent is hereby corrected as shown below:

Column 8, line 67 replace "(15)" with --(5)--;

Column 10, line 1 insert "2" after "Claim".

Signed and Sealed this

Twenty-fifth Day of February, 1992

*Attest:*

HARRY F. MANBECK, JR.

*Attesting Officer*  *Commissioner of Patents and Trademarks*